Feb. 23, 1971 M. C. PAUL ET AL 3,566,379

SHAPED MAGNETIC DRIVE FIELDS FOR MEMORY OPERATION

Filed March 5, 1969 7 Sheets-Sheet 1

INVENTORS
PAUL E. OBERG
MAYNARD C. PAUL

BY Kenneth S. Grace
ATTORNEY $t_1$ $t_2$ $t_3$ $t_4$

Feb. 23, 1971 M. C. PAUL ET AL 3,566,379
SHAPED MAGNETIC DRIVE FIELDS FOR MEMORY OPERATION
Filed March 5, 1969 7 Sheets-Sheet 5

$t_3$ $t_1$ $t_4$ $t_2$ $t_1$ $t_2$ $t_3$ $t_4$ 3,566,379
SHAPED MAGNETIC DRIVE FIELDS FOR MEMORY OPERATION

Maynard C. Paul and Paul E. Oberg, Minneapolis, Minn., assignors to Sperry Rand Corporation, New York, N.Y., a corporation of Delaware Filed Mar. 5, 1969, Ser. No. 804,506
Int. Cl. G11c *11/14, 27/00*
U.S. Cl. 340—174 18 Claims

ABSTRACT OF THE DISCLOSURE

Methods of and apparatus for generating shaped magnetic drive fields for operating a thin-ferromagnetic-film memory element having uniaxial anisotropy and small, e.g., $\alpha_{90}$ approximately 2 degrees, easy axis dispersion. Shaped conductors are inductively coupled to the memory element for alternatively providing an effective dispersion of the hard axis, or easy axis, drive field. The arrangement is utilized as an analog storage device in one embodiment by concurrently coupling to the memory element: a continuously varying amplitude analog signal that generates a corresponding magnetic easy axis $H_L$ drive field magnitude variation; and, a constant magnitude hard axis $H_T$ drive field of a magnitude equal to or greater than $H_K$ of the memory element and that is directionally curved, or shaped, for temporarily orienting the element's magnetization directions across its planar dimensions in a uniformly varying pattern. When the hard axis drive field is decoupled from the memory element the memory element's varyingly biased magnetization, due to the shaped hard axis drive field, is set into a partially switched remanent state, or flux level, which level is representative of the amplitude of the analog signal at the instant the hard axis drive field is decoupled, or removed, from the memory element.

BACKGROUND OF THE INVENTION

The present invention relates to the operation of magnetizable memory elements and in particular to such memory elements that are comprised of at least one thin-ferromagnetic-film layer having single domain properties. The layer, in addition, possesses the property of uniaxial anisotropy providing a mean easy axis along which the memory element's remanent magnetization shall lie in a first or a second and opposite direction and shall have small angular distribution of the layer's easy axes. The generation of such thin-ferromagnetic-film layers is exemplified by the S. M. Rubens Pat. No. 2,900,282. Such thin-ferromagnetic-film layers when fabricated in matrix arrays exemplified by the S. M. Rubens et al. Pat. No. 3,155,561 and when operated in a domain rotational mode as exemplified by the S. M. Rubens et al. Pat. No. 3,030,612 provides highly efficient, compact apparatus for the storage of information.

Such thin-ferromagnetic-film layers, due to their extremely fast switching characteristics and their ability to retain, for long durations and under extreme environmental conditions, their information content make ideal storage devices for the recording of analog data. The copending patent application of Robert A. White et al., Ser. No. 456,365, filed May 18, 1965, now Pat. No. 3,457,554, provides a novel apparatus for and a method of operation of a thin-ferromagnetic-film layer wherein the layer's angular dispersion characteristic is utilized to permit the storage of discrete levels of sampled data as a function of the degree of rotation of the layer's magnetization when subjected to coincident longitudinal $H_L$ and transverse $H_T$ drive field switching components. This Robert A. White et al. patent application is concerned with the establishment of a predeterminably variable magnetic flux level in the magnetizable element, which flux level is representative of the amplitude of an instantaneous amplitude of a sampled analog signal.

In a preferred embodiment of such Robert A. White et al. patent application, an incremental portion of an analog signal from a first source is gated into the magnetizable element by a strobe pulse from a second source. The analog signal is coupled to the magnetizable element as a longitudinal drive field component $H_L$, the maximum intensity of which is limited to a level well below the switching threshold $H_C$ of the magnetizable element such that the analog signal itself is incapable of effecting irreversible switching of the flux thereof. A strobe pulse is coupled to the magnetizable element as a transverse drive field component $H_T$ and has an intensity, i.e., $H_T \geqslant H_K$, sufficient to cause the magnetizable element's magnetization to become aligned substantially orthogonal to its mean easy axis, i.e., aligned along its hard axis. With a magnetizable element possessing the suitable angular dispersion characteristics the longitudinal drive field component produced by the analog signal biases the magnetizable element's magnetization away from such hard axis a degree that is a function of the intensity of the longitudinal drive field. At the particular instant that the analog signal amplitude is to be sampled the strobe pulse generated transverse drive field is removed, permitting the analog signal to set the magnetization of the magnetizable element into a discrete level of partial switching which level of partial switching is representative of the amplitude of the analog signal at the instant of the removal of transverse drive field. Different incremental portions, i.e., instantaneous amplitudes, of the analog signal may be gated into the magnetizable element by the determination of the particular turn-off time of the strobe pulse. Additionally, a plurality of different incremental portions of the analog signal may be gated into a corresponding plurality of different magnetizable elements by delaying the analog signal different time increments with respect to the strobe pulse wherein each different time delayed increment of the transient signal is gated by the strobe pulse into a separate magnetizable element so that each separate magnetizable element stores a flux level that is representative of a different sampled portion of the analog signal.

This patent application of Robert A. White et al., utilizes as the magnetizable element thin-ferromagnetic-film layers that may be fabricated in accordance with the S. M. Rubens Pat. No. 2,900,282. These layers preferably have single domain properties and possess the magnetic characteristic of uniaxial anisotropy providing a single average, or mean, easy axis with normal angular dispersion, e.g., $\alpha_{90}$ approximately 2 degrees, along which the remanent magnetization thereof lies in a first or in a second and opposite direction or in any intermediate partially switched magnetic state.

The thin-ferromagnetic-film layers utilized by the present invention preferably have single domain properties. The term "single domain property" may be considered to be the magnetic characteristic of a three-dimensional element of magnetizable material having a thin dimension that is substantially less than the width and length thereof wherein no magnetic domain walls can exist parallel to the large surface of the element. The term "magnetizable" material shall designate a substance having a remanent magnetic flux density that is substantially high, i.e., approaches the flux density at magnetic saturation. Such layers provide the desired characteristics to function as a detector for sampled portions of an analog signal, as magnetic amplifiers, magnetometers, etc. However, such layers do have an undesirable shortcoming in that their angular dispersion curve is substantially linear over only about 45 percent of their total irreversibly switchable magnetization. It is highly desirable that there be provided, for such devices, thin-ferromagnetic-film layers having similar physical dimensions and magnetic characteristics but being capable of having an effective linear angular dispersion curve over substantially 100 percent of their irreversibly switching magnetization. Such layers would, without affecting the physical size of the recording system, permit the sampling of analog signals having maximum amplitudes substantially greater than that of the prior art thin-ferromagnetic-film layer discussed in the patent application of Robert A. White et al., and would allow more different discrete magnetic states to be stored in each layer.

SUMMARY OF THE INVENTION

The present invention relates to methods of and apparatus for generating shaped magnetic drive fields for causing to operate a thin-ferromagnetic-film element having uniaxial anisotropy as having an effective linear angular dispersion curve over substantially 100 percent of its irreversibly switching magnetization. The thin-ferromagnetic-film layers utilized by the present invention may be similar to those discussed in the above referenced patent application of Robert A. White et al., having small angular distribution of the easy axes, i.e., low angular dispersion, about their mean easy axis. The improved operating characteristics of the device of the present invention are achieved by utilizing shaped conductors or electromagnetic devices whose magnetic fields are inductively coupled to the memory element for providing an effective dispersion of the, e.g., hard axis drive field. The directionally curved, or shaped, hard axis drive field induces a temporary angular distribution of magnetization directions across the thin-ferromagnetic-film layer in a uniformly varying pattern. Application of a straight easy axis signal field, followed by removal of the curved nominal hard axis field will then cause a greater portion of the film's magnetization to rotate in the signal field preferred easy axis direction. The net magnetization obtained is substantially proportional to the applied longitudinal, easy axis, field amplitude. The present invention then, in one embodiment, involves the application of a hard axis drive field that has a controlled dispersion, or is directionally curved or shaped, to a thin-ferromagnetic-film layer having a small angular distribution of its easy axes about its mean easy axis, e.g., $\alpha_{90}=1.4$ degrees, to effect an analog storage device that establishes the remanent magnetization of the thin-ferromagnetic-film layer in a discrete level of partial switching, which level is representative of the amplitude of the analog signal at an associated sample time when the hard axis drive field is removed.

FIGS. *3a*, *3b*, *3c* are illustrations of the vector orientations of the effects of the associated drive fields upon the magnetization of layer 10.

Figure 2:
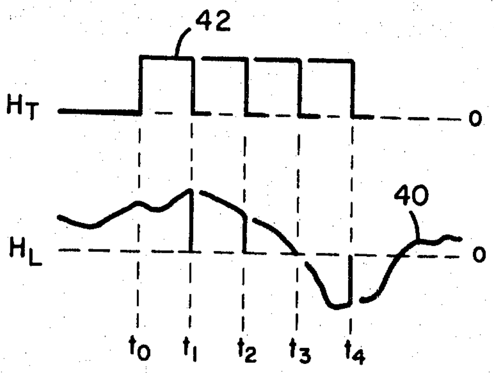
FIG. 2 is an illustration of the signal waveforms associated with the embodiment of FIG. 1.

FIGS. *4a*, *4b*, *4c*, *4d* illustrate the magnetization orientation associated with the waveforms of FIG. 2.

Figure 5:
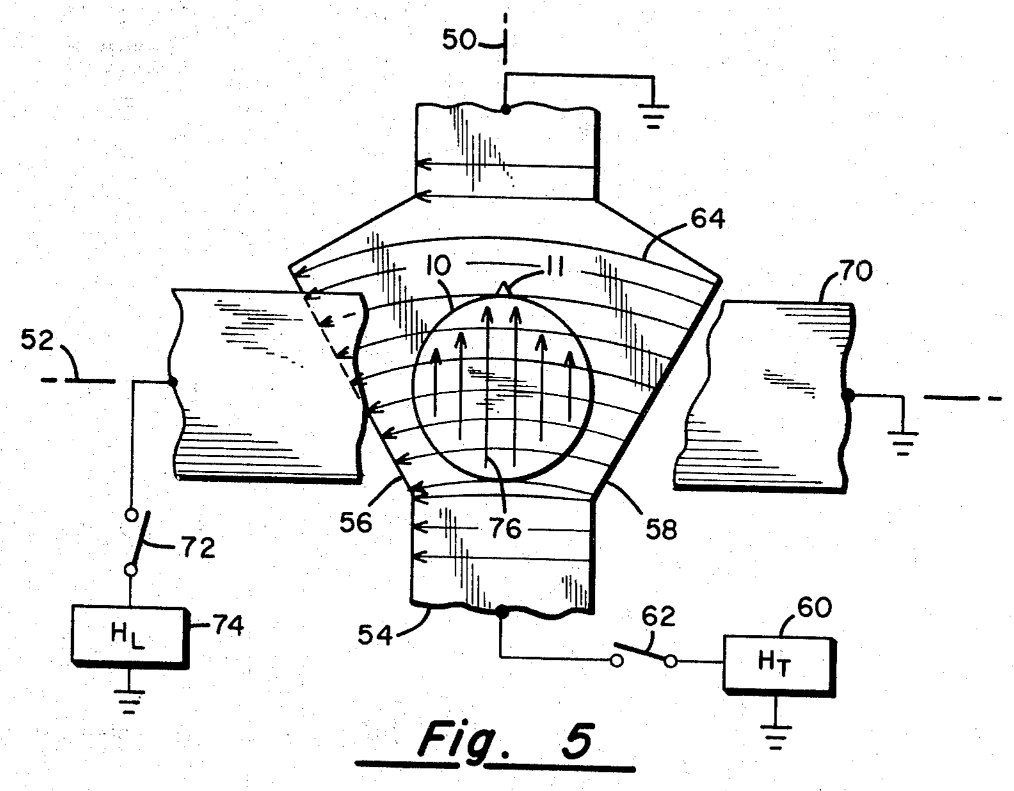

FIG. 5 is an illustration of a second embodiment of the present invention.

Figure 6:
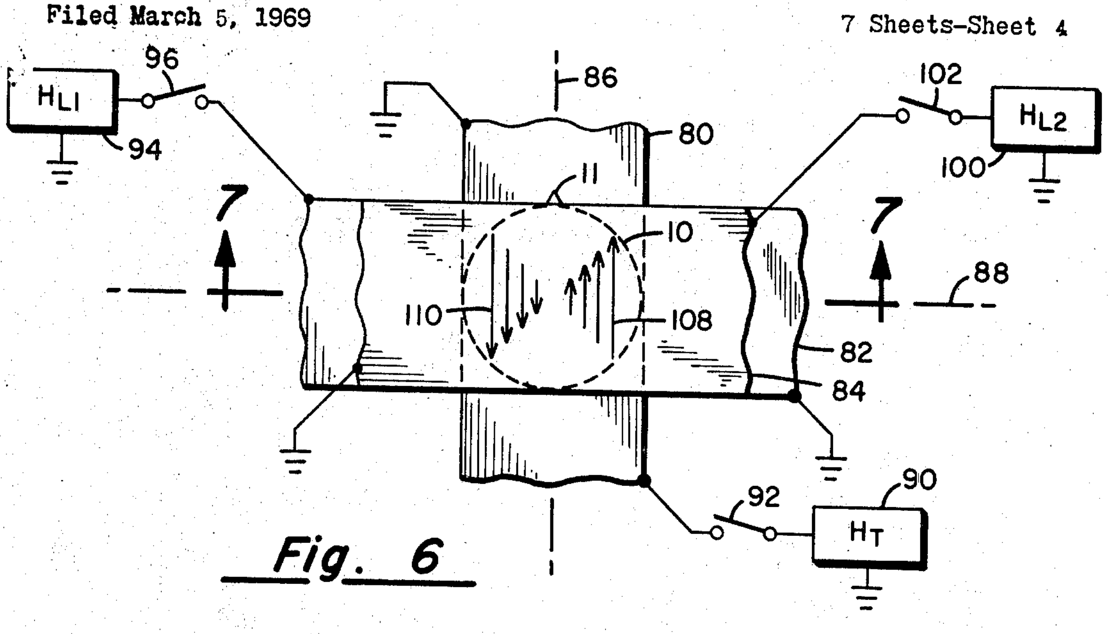

FIG. 6 is an illustration of a third embodiment of the present invention.

Figure 7:
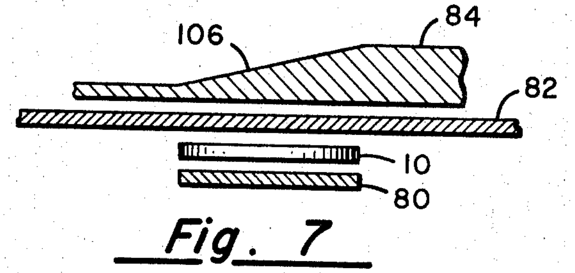

FIG. 7 is an illustration of a cross-section taken along line 7—7 of FIG. 6.

Figure 8:
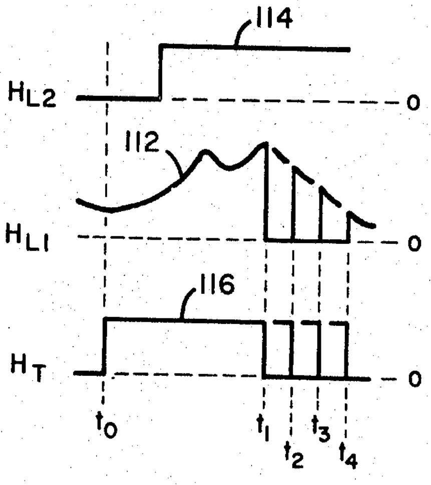

FIG. 8 is an illustration of the signal waveforms associated with the embodiment of FIG. 6.

FIGS. *9a–9d* illustrate the magnetization orientation associated with the waveforms of FIG. 6.

Figure 10:
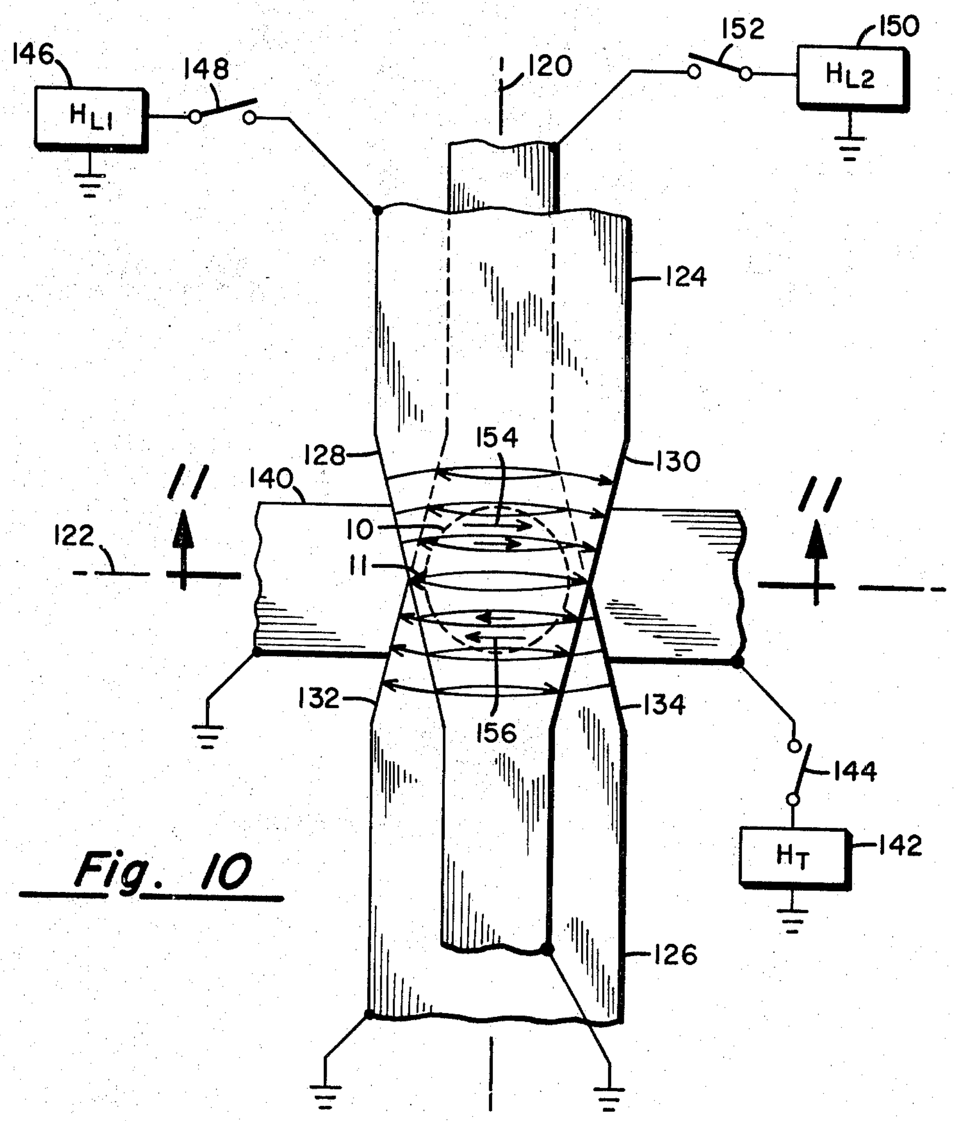

FIG. 10 is an illustration of a fourth embodiment of the present invention.

Figure 11:
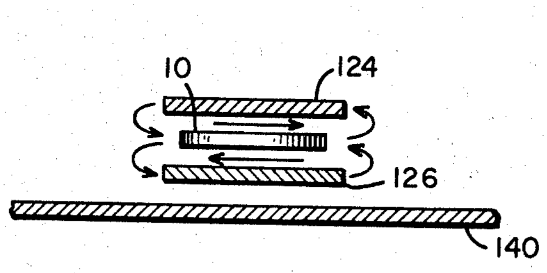

FIG. 11 is an illustration of a cross section taken along line 11—11 of FIG. 10.

Figure 12:
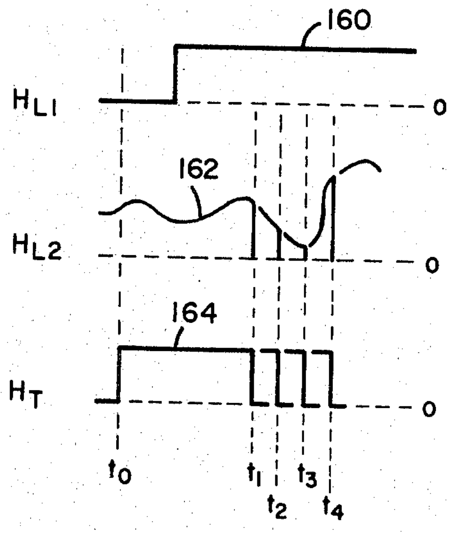

FIG. 12 is an illustration of the signal waveforms associated with the embodiment of FIG. 10.

FIGS. *13a–13d* illustrates the magnetization orientation associated with the waveforms of FIG. 10.

Figures 14, 15:
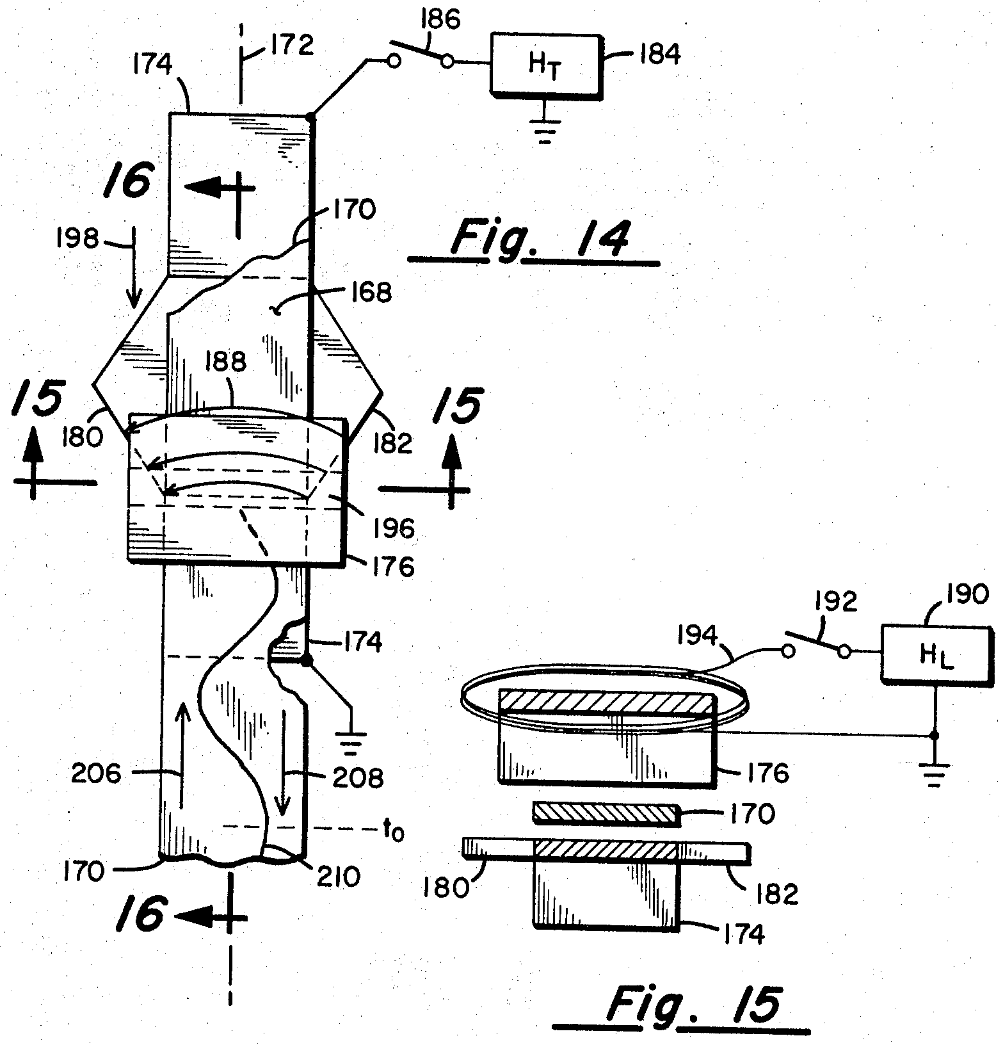

FIG. 14 is an illustration of a fifth embodiment of the present invention.

FIG. 15 is an illustration of a cross section taken along line 15—15 of FIG. 14.

Figure 16:
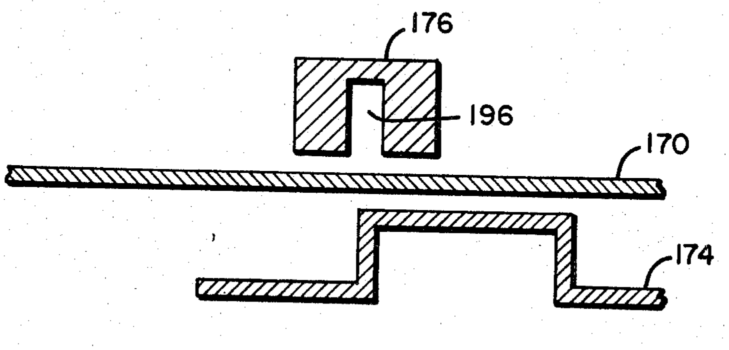

FIG. 16 is an illustration of a cross section taken along line 16—16 of FIG. 14.

Figure 17:
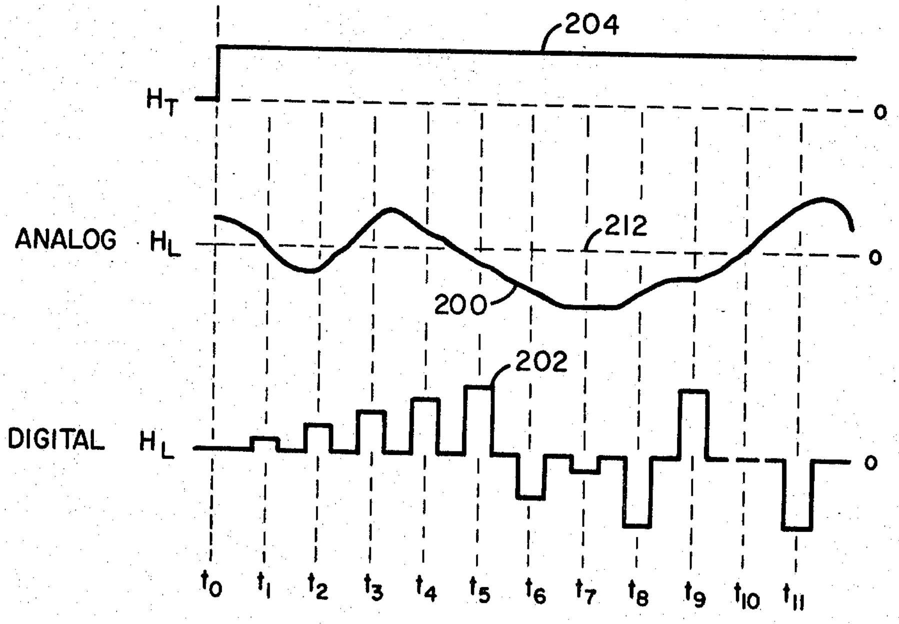

FIG. 17 is an illustration of the signal waveforms associated with the embodiment of FIG. 14.

Figure 18:
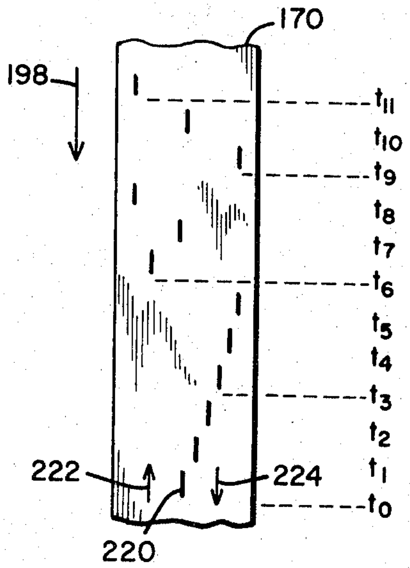
Figure 9A:
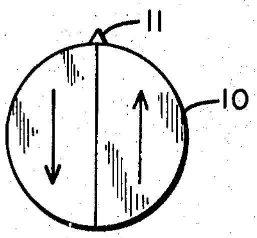
Figure 9B:
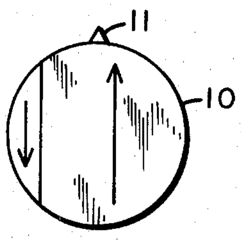
Figure 9C:
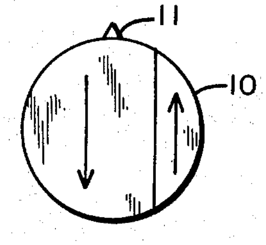
Figure 9D:
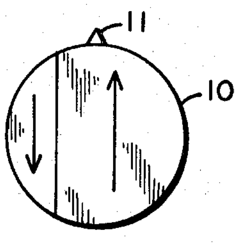
Figure 13A:
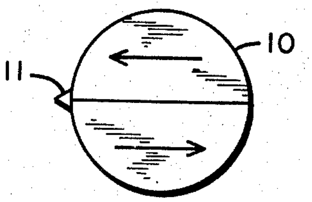
Figure 13B:
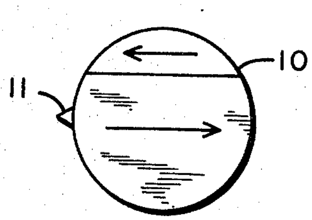
Figure 13C:
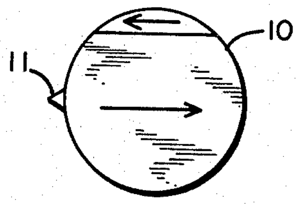
Figure 13D:
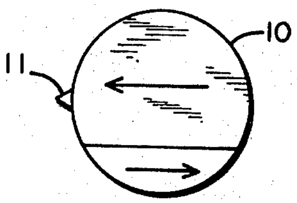

FIG. 18 is an illustration of a digital recording format utilizing the embodiment of FIG. 14.

DESCRIPTION OF THE PREFERRED EMBODIMENTS

Figure 1:
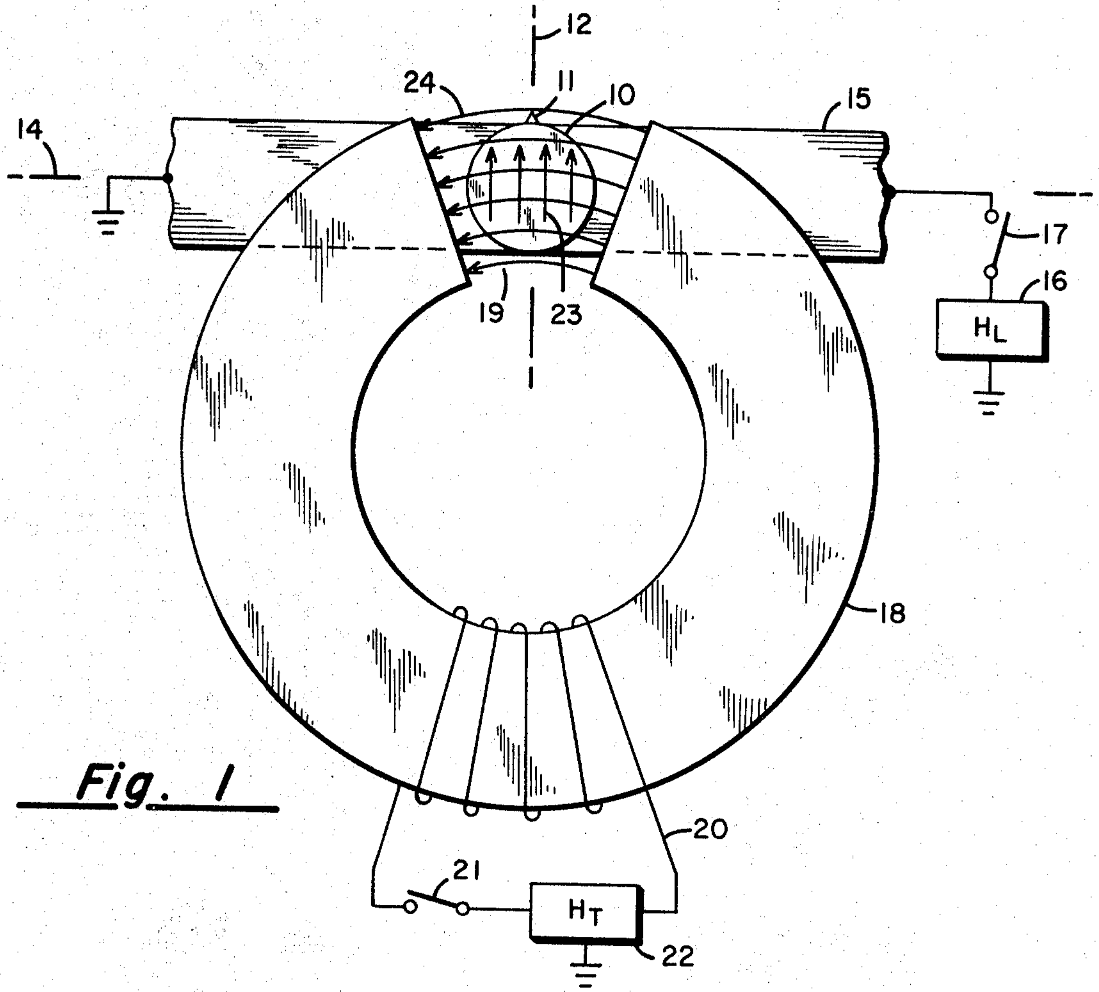
FIG. 1 is an illustration of a first embodiment of the present invention.

With particular reference to FIG. 1, there is presented an illustration of a first embodiment of the present invention. This embodiment, as do all other illustrated embodiments unless otherwise noted, includes a memory element 10 comprised of a thin-ferromagnetic-film layer of approximately 81% Ni–19% Fe having single domain properties and possessing the magnetic characteristic of uniaxial anisotropy providing a single average, or mean, easy axis along with the remanent magnetization thereof lies in a first or in a second and opposite direction. For purposes of orienting layer 10, its mean easy axis 11, as denoted by the point 11, is aligned with axis 12 and its hard axis is aligned with axis 14. Additionally, layer 10 preferably has a small angular distribution of the layer's plurality of domains' easy axes about its mean easy axis, i.e., an $\alpha_{90}$ of 1.4 degrees may be considered typical.

Below layer 10 and with its longitudinal axis aligned with axis 14 lies a straight drive line 15 which is selectively coupled to source 16 of the easy axis drive field $H_L$ by switch means 17. Centered along axis 12 lies a split toroid 18 which is made of high permeability, low remanence material such as iron, and having a nonparallel, opposite sided air gap 19 in which layer 10 is centrally located. Selectively coupled to toroid 18 by winding 20 and switch means 21 is a source 22 of the hard axis drive field $H_T$ for selectively providing in air gap 19 a directionally curved, or shaped, hard axis drive field $H_T$ of a magnitude $\geqslant H_K$ of layer 16. The directionally curved, or shaped, hard axis drive field $H_T$ induces a temporary angular distribution of magnetization directions across layer 10 in a uniformly varying pattern in the plane of the layer.

If, concurrent with the application of the shaped hard axis drive field $H_T$ to layer 10, a continuously varying amplitude analog current signal is coupled to line 15 there is coupled to layer 10 a corresponding easy axis drive field $H_L$ magnitude variation which produces a corresponding varying bias of the magnetization of layer 10. This bias is a function of the amplitude of the analog signal. If, with the concurrent application of the easy axis drive field $H_L$, schematically represented by vectors 23, the hard axis drive field $H_T$, schematically represented by vectors 24, is removed, the magnetization of layer 10 is set into a partially switched remanent state, or flux level, which level is representative of the amplitude of the analog signal generated easy axis drive field $H_L$ at the instant the hard axis drive field $H_T$ is decoupled, or removed, from the layer 10. This switching mechanism is somewhat similar to that of the above discussed patent application of Robert A. White et al.

With particular reference to FIG. 2 there is presented an illustration of the signal waveforms associated with the embodiment of FIG. 1 for achieving analog storage in layer 10. With source 16, by means of switch 17, coupling an analog current signal having the waveform 40 to drive line 15, there is generated in the area of air gap 19 an easy axis drive field $H_L$ having the time varying amplitude of waveform 40. This easy axis drive field $H_L$ is, in FIG. 1, schematically illustrated by vectors 23. As noted hereinabove the maximum intensity of the easy axis drive field $H_L$ is limited to a level well below the switching threshold $H_C$ of layer 10 such that the analog signal 40 itself is incapable of effecting irreversible switching of the flux level thereof.

Now, if at a time $t_0$ source 22, by means of winding 20 and switch 21, induces a magnetic field in toroid 18 there is generated in air gap 19 a constant magnitude hard axis drive field $H_T$ of a magnitude $\geqslant H_K$ of layer 10 and that is directionally curved, or shaped, for temporarily orienting the magnetization directions of layer 10 across its planar dimensions into a uniformly varying pattern. This directionally curved, or shaped, hard axis drive field $H_T$ of waveform 42 is schematically illustrated in air gap 19 by vectors 24.

Now, if at any subsequent time, e.g., $t_1$, $t_2$, $t_3$, $t_4$, switch 21 is opened, the directionally curved, or shaped, constant magnitude hard axis drive field $H_T$ is removed from air gap 19. Layer 10's magnetization (which is continuously varyingly biased by the easy axis drive field $H_L$ having the varying intensity in air gap 19 represented by waveform 40) is set into a partially switched remanent state, or flux level, which level is representative of the amplitude of the analog signal represented by waveform 40 at the instant the hard axis drive field $H_T$ is decoupled, or removed from layer 10.

Figures 3A, 3B, 3C:
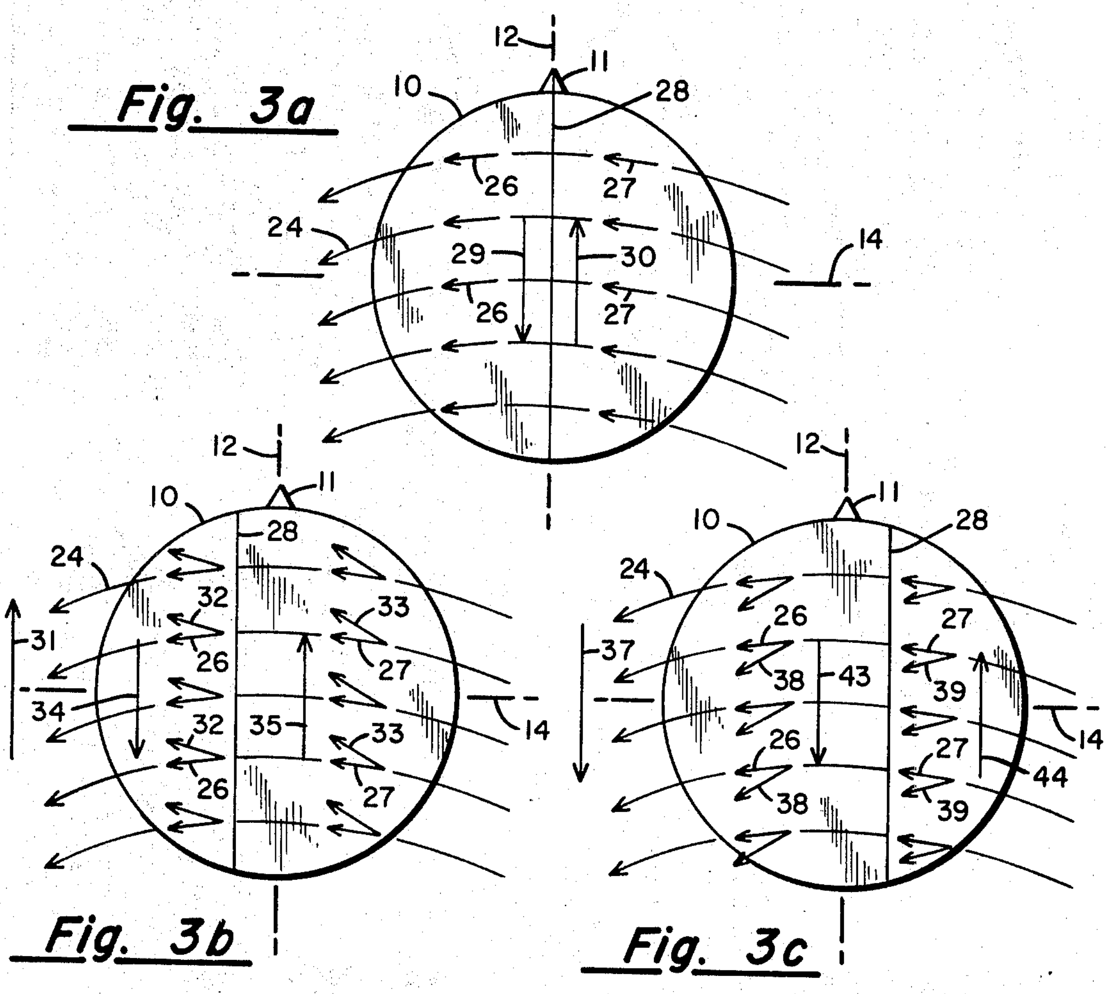

With particular reference to FIGS. 3*a*, 3*b*, 3*c* there are presented illustrations of the vector orientations and of the final magnetization orientations of layer 10. For purposes of orienting layer 10 with its respectively associated drive fields $H_L$, $H_T$, mean easy axis 11 of layer 10 is aligned with axis 12 while its orthogonally oriented hard axis is aligned with axis 14. FIGS. 3*a*, 3*b*, 3*c* illustrate the conditions wherein there is generated, in the area of layer 10, a directionally curved, or shaped, nominal hard axis drive field $H_T$, schematically represented by vectors 24; and: a 0 intensity easy axis drive field $H_L$; a positive polarity easy axis drive $H_L$; and, a negative polarity easy axis drive field $H_L$, respectively. Although the hard axis drive fields $H_T$, represented by vectors 24, are depicted as parallel arcs it is to be appreciated that such fields could be arcs of concentric circles or lines of varying orientation across the planar dimension of layer 10, the primary requirement being that such fields are symmetrical about the mean easy axis 11 of layer 10.

In FIG. 3*a* with a 0 intensity easy axis drive field $H_L$ being coupled to layer 10 the magnetization to the left of axis 12, represented by vectors 26 and the magnetization to the right of axis 12, represented by vectors 27, are biased by the hard axis drive field $H_T$ in equal but opposite polarizations, vectors 26 in a downward direction and vectors 27 in an upward direction. The magnetization of layer 10, upon removing the hard axis field $H_T$, is set into two large domains, separated by domain wall 28, of equal area but of opposite polarizations, represented by vectors 29 and 30, respectively, oriented along axis 12, and, accordingly, parallel to the mean easy axis 11 of layer 10.

In FIG. 3*b* there are coupled to layer 10 the shaped nominal hard axis drive field $H_T$, represented by vectors 24, as in FIG. 3*a*, plus a positive polarity easy axis drive field $H_L$, represented by vector 31. Under these conditions, the vectors 26, 27 aligned with vectors 24, are rotated out of alignment with the applied shaped nominal hard axis drive field $H_T$ into new orientations represented by vectors 32, 33, respectively. Due to the differing effects upon the orientation of the magnetization of layer 10 as illustrated by vectors 32, 33 to the left and to the right of axis 12, respectively, a portion of the magnetization to the left of axis 12 is biased sufficiently in an upward direction so that upon the removal of the hard axis drive field $H_T$ of vectors 24 the domain wall 28 is shifted to the left forming the final magnetic states of two unequal area domains with their opposite polarities represented by vectors 34, 35 oriented parallel to axis 12.

In FIG. 3*c* there are coupled to layer 10 the shaped nominal hard axis drive field $H_T$ represented by vectors 24, as in FIG. 3*a*, plus a negative polarity easy axis drive field $H_L$ represented by vector 37. Under these conditions the vectors 26, 27 aligned with vectors 24, are rotated out of alignment with the applied shaped hard axis drive field $H_T$ into new orientations represented by vectors 38, 39, respectively. Due to the differing effects upon the orientation of the magnetization of layer 10 as illustrated by vectors 38, 39 to the left and to the right of axis 12, respectively, a portion of the magnetization of axis 12 is biased to the right sufficiently in a downward direction so that upon the removal of the hard axis drive field $H_T$ of vectors 24 the domain wall 28 is shifted to the right forming the final magnetic states of two unequal area domains with their opposite polarities represented by vectors 43, 44 oriented parallel to axis 12.

Figure 4A:
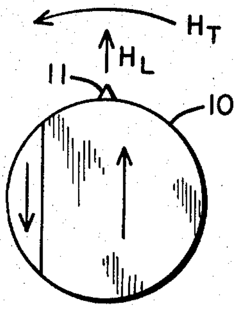

With particular reference to FIGS. 4*a*, *b*, *c*, *d* there are presented illustrations of the final magnetization orientations of layer 10 associated with the waveforms of FIG. 2 at the associated sample times $t_1$, $t_2$, $t_3$, $t_4$, respectively.

Figure 4B:
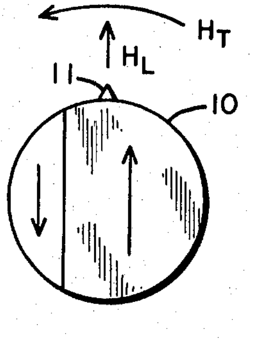
Figure 4C:
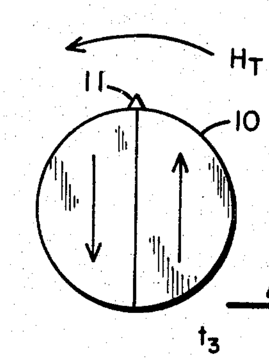
Figure 4D:
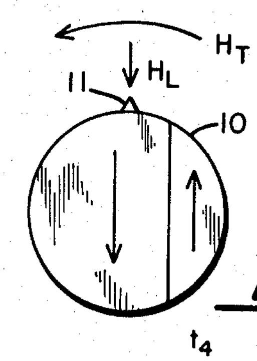

The flux levels set into layer 10 vary from the two completely switched limits in which all the magnetization thereof is set into one large domain of a first or of a second and opposite polarity along its easy axis 11 to many intermediate, partially switched flux levels. With the easy axis drive field $H_L$ being of a 0 intensity at the sample time, i.e., when the hard axis drive field $H_T$ is removed from layer 10, as at time $t_3$, the magnetization of layer 10 assumes two large domains each of equal area but of opposite polarizations aligned along its mean easy axis 11. This condition is schematically illustrated at FIG. 4*c* and is generally defined as the "demagnetized" or "rest" condition. For intermediate intensities (and opposite polarities), as at times $t_1$, $t_2$, $t_4$, the magnetization of layer 10 assumes two domains of unequal areas and of opposite polarities, the polarity of the larger domain, or area, being determined by the polarity of the waveform 40 at the particular sample time. As an example, with the positive polariy waveform 40 a time $t_2$ the large domain is oriented in an upward direction as at FIG. 4*b*. In contrast with the negative polarity of waveform 40 at time $t_4$ the larger domain is oriented in a downward direction, as in FIG. 4*d*.

Readout of the information stored by the present invention is not a part of the present invention; any of well-known flux sensing or magneto-optic techniques may be utilized. As layer 10, as discussed with respect to FIGS. 3, 4 does assume two (or as a limit one) well defined domains of opposite polarities separated by a sharply defined domain wall, magneto-optic techniques are especially applicable. Additionally, methods of construction of the several embodiments illustrated herein may be any of several well-known techniques; printed circuit conductors including copper foil or deposited magnetic and/or conductive layers may be used.

With particular reference to FIG. 5 there is presented an illustration of a second embodiment of the present invention. In this embodiment the mean easy axis 11 of layer 10 is aligned with axis 50 while orthogonal thereto its hard axis is aligned with axis 52. This embodiment includes a tapered drive line 54 symmetrically oriented about axis 50 having nonparallel opposing edges 56, 58 that are linearly tapered from a first relatively narrow dimension across axis 50 to a second relatively wide dimension across axis 50. Source 60 is selectively coupled to tapered drive line 54 by switch 62 for coupling a constant-amplitude hard axis signal thereto. With source 60 coupling its current signal to tapered drive line 54 there is generated a magnetic field thereabout, which according to the well-known right hand rule, assumes the directionally curved, or shaped, drive field schematically illustrated by vectors 64.

As is well-known, a magnetic field exists outside the current carrying conductor, which is the source of the magnetic field, and the lines of flux are oriented in a direction perpendicular, or orthogonal, to the direction of incremental current paths in the conductor. Accordingly, the resultant magnetic field caused by the current signal flowing through tapered line 54 in its straight drive line portions, which portions are substantially inductively decoupled from layer 10, are directed perpendicular to the straight edges, and accordingly axis 50. In contrast, the magnetic field, or lines of flux, in the area of the tapered portion of tapered drive line 54, which tapered portion is substantially inductively coupled to layer 10, is a directionally curved, or shaped, drive field which in its geometry conforms orthogonally to the direction of current flow in the conductor resulting in a field pattern between the tapered edges 56, 58 as schematically illustrated by vectors 64.

Layer 10 is substantially centrally located between the edges 56, 58 whereby the directionally curved, or shaped, drive field, which field is schmatically represented by vectors 64, is directed nominally transverse the mean easy axis 11 of layer 10 providing a shaped hard axis drive field $H_T$ which induces a temporary angular distribution of magnetization directions across layer 10 in a uniformly varying pattern in the plane of the layer.

Superposed shaped drive line 54 and layer 10 is arranged a straight drive line 70, which is symmetrically oriented about axis 52. Selectively coupled to straight drive line 70 by switch 72 is source 74 of a current signal, which due to the well-known right hand rule, generates, in the area of layer 10 the straight drive field schematically illustrated by vectors 76. With straight drive line 70 oriented with its longitudinal axis parallel to axis 52 and, accordingly, with its magnetic axis parallel to axis 50 the straight drive field schematically represented by vectors 76 in the area of layer 10 due to the current signal flowing through straight drive line 70 is substantially parallel to the easy axis of layer 10. Accordingly, straight drive line 70 couples an easy axis drive field $H_L$ to layer 10.

With tapered drive line 54, layer 10 and straight drive line 70 arranged in a stacked, superposed relationship, the signal waveforms previously discussed with particular reference to FIG. 1, FIGS. *4a*, *4b*, *4c*, *4d* operate upon layer 10 in the same manner as discussed above. It is to be noted that in both the embodiments of FIG. 1 and FIG. 5 the directionally curved, or shaped, drive field is a hard axis drive field $H_T$ with the straight drive field being an easy axis drive field $H_L$. Additionally, when operated as an analog device, the shaped hard axis drive field $H_T$ of waveform 42 is of a constant amplitude $\geq H_K$ of layer 10 while the straight easy axis drive field $H_L$ of waveform 40 is of a continually varying amplitude analog signal whose maximum amplitude is less than the switching threshold $H_C$ of layer 10.

With particular reference to FIG. 6 there is presented an illustration of a third embodiment of the present invention. This embodiment includes the stacked, superposed configuration of straight drive line 80, layer 10, straight drive line 82 and wedge-shaped drive line 84. The longitudinal axis of straight drive line 80 and the mean easy axis 11 of layer 10 are aligned substantially parallel to axis 86 while orthogonal thereto, with their longitudinal axes substantially parallel to axis 88, are straight drive line 82 and wedge-shaped drive line 84.

With source 90, by means of switch 92, selectively coupling a current signal to straight drive line 80 there is generated in the area of layer 10 a drive field that is oriented substantially orthogonal to the mean easy axis 11 of layer 10 coupling a hard axis drive field $H_T$ thereto.

With source 94, by means of switch 96, selectively coupling a current signal to straight drive line 82 there is generated in the area of layer 10 a drive field that is oriented substantially parallel to the mean easy axis 11 of layer 10. Accordingly, straight drive line 82 may be considered to couple a first straight easy axis drive field $H_{L1}$ to layer 10.

With source 100, by means of switch 102, selectively coupling a current signal to wedge-shaped drive line 84 there is generated in the area of layer 10 a drive field that is oriented substantially parallel to the mean easy axis 11 of layer 10. Accordingly, wedge-shaped drive line 84 may be considered to couple an easy axis drive field $H_{L2}$ of varying intensity across the surface of layer 10.

With particular reference to FIG. 7 there is presented an illustration of a cross section taken along line 7—7 of FIG. 6. FIG. 7 is particularly presented to schematically illustrate in detail the stacked, superposed arrangement of drive lines 80, 82, 84 and layer 10 and the nature of the wedge of wedge-shaped drive line 84 in the area of layer 10. It is to be appreciated that in consideration of typical dimensions of the elements involved, FIG. 7 does not attempt to depict relative sizes nor other necessary elements not a functional part of the working device. Such other necessary elements would include a supporting substrate(s) and insulative layers. In a typical embodiment, layer 10 could have the following characteristics:

$H_C$=1.5 oersteds (oe.)
$H_K$=3.43 oe.
$\alpha_{90}$=1.4 degrees
Thickness=1100 angstroms (A.)
Diameter=8.0 millimeters (mm.)

while the drive lines could be copper foil of 0.10 mm. in thickness with a polished glass substrate for layer 10 of 0.50 mm. in thickness. Insulative layers could be a Mylar sheet of 0.50 mm. in thickness with the elements assembled by a suitable adhesive.

Wedge-shaped drive line 84 in the wedge area 106 is linearly tapered from a relatively thin depth, e.g., 0.10 mm., at a first edge of layer 10 to a relative thick depth, e.g., 1.00 mm. at a second, opposite edge of layer 10. This tapered depth of wedge-shaped drive line 84 with a current signal flowing thereto provides cross sectional areas of differing current densities and of differing distances from layer 10 whereby the resulting straight easy axis drive field $H_L$ can be caused to vary in a predetermined intensity variation across layer 10. In an alternative construction, wedge-shaped drive line 84 could be formed of a copper foil of 0.10 mm. in thickness but with a varied spacing from layer 10, e.g., conforming to the top surface of wedge-shaped drive line 84 as in area 106.

For purposes of illustration assume that the intensity of the first easy axis drive field $H_{L1}$ is of an equal intensity but of an opposite polarity to that of the second easy axis drive field $H_{L2}$ at the center of layer 10 along axis 86. Under these conditions, the domain wall established in layer 10 by the associated drive fields is along the center of layer 10 along axis 86 separating the two domains of equal areas but of opposite polarizations. The net effective easy axis drive field under these conditions is schematically illustrated by vectors 108, 110 across the planar dimension of layer 10.

With particular reference to FIG. 8 there is presented an illustration of the signal waveforms associated with the embodiment of FIG. 6. Waveforms 112, 114 represent the intensity, in the area of layer 10, of the first easy axis drive field $H_{L1}$ and the second easy axis drive field $H_{L2}$; with waveform 114 representing a constant amplitude drive field while waveform 112 represents the continuously varying amplitude of an analog signal coupled to straight drive line 82. In contrast, waveform 116 represents the intensity, in the area of layer 10, of the constant amplitude hard axis drive field $H_T$ provided by straight drive line 80. In this embodiment, due to the polarities of waveforms 112, 114 and their opposite flowing directional nature in their associated straight drive line 82 and wedge-shaped drive line 84, waveforms 112, 114 are subtractive in nature in the area of layer 10 with the net effective easy axis drive field $H_L$ being limited to a level well below the switching threshold $H_C$ of layer 10.

If at a time $t_0$, source 90, through switch 92, couples a current signal of waveform 116 to drive line 80 there is generated in the area of layer 10 a hard axis drive field $H_T$ of a magnitude $\geq H_K$ of layer 10, which field causes the magnetization of layer 10 to become substantially aligned along its hard axis along axis 88. Subsequently, when source 94 through switch 96 and source 100 through switch 102 couple current signals having the waveforms of 112 and 114 to straight drive line 82 and to wedge-shaped drive line 84 there is generated in the area of layer 10 an amplitude-varying and directionally varying, net effective easy axis drive field $H_L$. This net effective easy axis drive field $H_L$ temporarily orients the magnetization directions of layer 10 across its planar dimensions into a varying pattern representative of the varying intensity of the net effective easy axis drive field $H_L$ across layer 10 as determined by the varying amplitude of waveform 112 and the nature of wedge-shaped drive line 84 in the area 106.

If at any subsequent time, e.g., $t_1$, $t_2$, $t_3$, $t_4$, switch 92 is opened, the constant magnitude hard axis drive field $H_T$ is removed from layer 10 causing layer 10's magnetization (which is continuously varyingly biased by the net effective easy axis drive field $H_L$) is set into a partially switched remanent state, or flux level. This flux level is representative of the amplitude of the analog signal represented by waveform 112 at the instant the hard axis drive field $H_T$ of waveform 116 is decoupled, or removed, from layer 10.

With particular reference to FIGS. *9a, 9b, 9c, 9d* there are presented illustrations of the final magnetization orientations of layer 10 associated with the waveforms of FIG. 8 at the associated sample times $t_1$, $t_2$, $t_3$, $t_4$, respectively. With particular reference to FIG. *9a* there is illustrated the condition discussed with reference to FIG. 6 and illustrated by vectors 108, 110. Under this condition the magnetization of layer 10 assumes two large domains each of equal area but of opposite polarizations aligned along its mean easy axis 11. This is generally defined as the "demagnetized" or "rest" condition. For other intensities as at times $t_1$, $t_2$, $t_4$, the magnetization of layer 10 assumes two domains of unequal areas and of opposite polarities, the polarity of the domains, or areas, being determined by the polarity of the net effective easy axis drive field $H_L$ coupling with that particular area of the layer 10 at a particular sample time.

With particular reference to FIG. 10 there is presented an illustration of a fourth embodiment of the present invention. In this embodiment the mean easy axis 11 of layer 10 is aligned with axis 122 while orthogonal thereto its hard axis is aligned with axis 120. This embodiment includes a first tapered drive line 124 and a second tapered drive line 126 both symmetrically oriented about axis 120. Drive lines 124 and 126 have nonparallel opposing edges 128, 130 and 132, 134 that are linearly tapered from a first relatively narrow dimension across axis 120 to a second relatively wide dimension across axis 120. In the illustrated embodiment, the opposing edges 128, 130 and 132, 134 are illustrated as being linearly tapered; however, such is not to be considered a limitation to the present invention. As with the illustrated embodiment of the wedge-shaped drive line of FIG. 6, the shaped drive line in the area of layer 10 may be curvilinear or of an irregular contour as determined by the requirements of the system. Additionally, the shape of the tapered portions of the two shaped drive lines 124, 126 could be of a different contour.

This embodiment includes the stacked, superposed configuration of straight drive line 140, tapered line 126, layer 10 and tapered drive line 124. The longitudinal axis of straight drive line 140 and the mean easy axis 11 of layer 10 are aligned substantially parallel to axis 122, while orthogonal thereto, with their longitudinal axes substantially parallel to axis 120, are tapered drive lines 124 and 126.

With source 142, by means of switch of 144, selectively coupling a current signal to straight drive line 80 there is generated in the area of layer 10 a drive field that is oriented substantially orthogonal to the mean easy axis 11 of layer 10 coupling a hard axis drive field $H_T$ thereto.

With source 146, by means of switch of 148, selectively coupling a current signal to tapered drive line 124 there is generated in the area of layer 10 a directionally curved, or shaped, drive field that is oriented nominally parallel to the means easy axis 11 of layer 10. Accordingly, tapered drive line 124 may be considered to couple a first tapered easy axis drive field $H_{L1}$ to layer 10.

With source 150, by means of switch 152, selectively coupling a current signal to tapered drive line 126 there is generated, in the area of layer 10, a directionally curved, or shaped, drive field that is oriented nominally parallel to the mean easy axis 11 of layer 10. Accordingly, tapered drive line 126 may be considered to couple a second tapered easy axis drive field $H_{L2}$ to layer 10.

With particular reference to FIG. 11 there is presented an illustration of a cross section taken along line 11—11 of FIG. 10. FIG. 11 is particularly presented to schematically illustrate, in detail, the stacked, superposed arrangement of drive lines 140, 124, 126 and layer 10. As with FIG. 7, it is to be appreciated that FIG. 11 does not attempt to depict relative sizes nor other necessary elements not a functional part of the working device.

For purposes of illustration, assume that the intensity of the first easy axis drive field $H_{L1}$ is of an equal intensity but of an opposite polarity to that of the second easy axis drive field $H_{L2}$ at the center of layer 10 along axis 122. Under these conditions, and upon opening the switch 144 thus removing the hard axis field $H_T$, the domain wall established in layer 10 by the associated drive field is along the center line of layer 10 along axis 122 separating the two domains of equal areas but of opposite polarizations. The net effective easy axis drive field $H_L$ under these conditions is schematically illustrated by vectors 154, 156 across the planar dimension of layer 10.

With particular reference to FIG. 12 there is presented an illustration of the signal waveforms associated with the embodiment of FIG. 9. Waveforms 160, 162 represent the current amplitudes in the respective drive lines 124, 126 which give rise to the first easy axis drive field $H_{L1}$ and the second easy axis drive field $H_{L2}$; with waveform 160 representing a constant amplitude drive current, while waveform 162 represents the continuously varying amplitude of an analog signal coupled to tapered drive line 126. In contrast, waveform 164 represents the intensity, in the area of layer 10, of the constant amplitude hard axis drive field $H_T$, provided by straight drive line 140. In this embodiment, due to the polarities of waveforms 160, 162 and their opposite flowing directional nature in their associated tapered drive line 124 and tapered drive line 126, waveforms 160 and 162 are subtractive in nature in the area of layer 10 with the net effective easy axis drive field $H_L$ being limited to a level well below the switching threshold $H_C$ of layer 10.

If at a time $t_0$ source 142, through means of switch 144, couples a current signal of waveform of 164 to drive line 140 there is generated in the area of layer 10 a hard axis drive field $H_T$ of a magnitude $\geq H_K$ of layer 10, which field causes the magnetization of layer 10 to become substantially aligned along its hard axis along axis 120. Subsequently, when pulse source 146, through means of switch 148, and pulse source 150 through means of switch 152, couple current signals having the waveforms 160 and 162 to a tapered drive line 124 and tapered drive lines 126 there is generated in the area of layer 10 an amplitude-varying and directionally varying, net effective easy axis drive field $H_L$. This net effective easy axis drive field $H_L$ temporarily orients the magnetization directions of layer 10 across its planar dimensions into a varying pattern representative of the varying intensity of the net effective easy axis drive field $H_L$ across layer 10 as determined by the varying amplitude of waveform 162 and the nature of tapered drive lines 124, 126 in the area of layer 10.

If at any subsequent time, e.g., $t_1$, $t_2$, $t_3$, $t_4$, switch 142 is opened, the constant magnitude hard axis drive field $H_T$ is removed from layer 10 causing layer 10's magnetization (which is continuously varyingly biased by the net effective easy axis drive field $H_L$) is set into a partially switched remanent state, or flux level. This flux level is representative of the amplitude of the analog signal represented by waveform 162 at the instant the hard axis drive field $H_T$ of waveform 164 is decoupled, or removed, from layer 10.

With particular reference to FIGS. 13*a*, 13*b*, 13*c*, 13*d* there are presented illustrations of the final magnetization orientations of layer 10 associated with the waveforms of FIG. 12 at the associated sampling times $t_1$, $t_2$, $t_3$, $t_4$, respectively. With patrticular reference to FIG. 13*a* there is illustrated the condition discussed with reference to FIG. 10 and illustrated by vectors 154, 156. Under this condition the magnetization of layer 10 assumes two large domains of equal area but of opposite polarizations aligned along its mean easy axis 11. This is generally defined as the "demagnetized" or "rest" condition. For other intensities as at times $t_2$, $t_3$, $t_4$, the magnetization of layer 10 assumes two domains of unequal areas and of opposite polarities, the polarity of the domains, or areas being determined by the polarity of the net effective easy axis drive field $H_L$ coupling with that particular area of the layer 10 at a particular sample time.

It is to be noted that in both the embodiments of FIG. 6 and FIG. 10 there is utilized a straight hard axis drive field $H_T$ in contrast to the embodiments of FIG. 1 and FIG. 4. Additionally, both embodiments utilize a first easy axis drive field $H_{L1}$ and a second easy axis drive field $H_{L2}$: the embodiment of FIG. 6 utilizing a straight first easy axis drive field $H_{L1}$ and a second varying intensity easy axis field $H_{L2}$; with FIG. 10 utilizing varying intensity first and second easy axis drive fields $H_{L1}$ and $H_{L2}$.

With particular reference to FIG. 14 there is presented an illustration of a fifth embodiment of the present invention. In this embodiment the recording medium consists of tape 170 having a layer of thin-ferromagnetic-film layer 168 affixed thereto of approximately 81% Ni–19% Fe having single domain properties and possessing the magnetic characteristic of uniaxial anisotropy providing a single average, or mean, easy axis aligned with axis 172 along which the remanent magnetization thereof lies in a first or in a second and opposite direction. Additionally, as with the layer 10 of the previously discussed embodiments, layer 168 preferably has a small angular distribution of the layer's plurality of domains' easy axes about its means easy axis, e.g. an $\alpha_{90}$ of 1.4 degrees may be considered typical.

With particular reference to FIG. 15 there is presented an illustration of a cross section taken along line 15—15 of FIG. 14. FIG. 15 is particularly presented to schematically illustrate, in detail, the stacked, superposed arrangement of tapered drive line 174, tape 170 and recording head 176. As with FIG. 7 and FIG. 11, it is to be appreciated that in consideration of typical dimensions of the elements involved, FIG. 15 does not attempt to depict relative sizes nor other necessary elements not a functional part of the working device.

With particular reference to FIG. 16 there is presented an illustration of a cross section taken along line 16—16 of FIG. 14. FIG. 16 is particularly presented to schematically illustrate, in detail, the arrangement of tapered drive line 174 in the area of air gap 196.

This embodiment includes a tapered drive line 174 symmetrically oriented about axis 172 having opposing edges 180, 182 that are linearly tapered from a first relatively narrow dimension across axis 172 to a second relatively wide dimension across axis 172. Source 184 is selectively coupled to tapered drive line 174 by switch 186 for coupling a constant hard axis current signal thereto. With source 184 coupling its current signal to tapered drive line 174 there is generated a magnetic field thereabout, $H_T$, which according to the well-known right hand rule, assumes the directionally curved, or shaped, drive field schematically illustrated by vectors 188. This arrangement is similar to that previously discussed with particular reference to FIG. 5.

Superposed above tapered drive line 174 and centrally oriented about axis 172 is recording head 176 which sandwiches tape 170 therebetween. Centrally located between the opposing pole pieces and directed transverse axis 172 there is provided an air gap 196 for providing a straight easy axis drive field that is directed substantially parallel to axis 172, and, accordingly, the mean easy axis of tape 170. Selectively coupled to head 176 by winding 194 and switch 192 is a source 190 of the easy axis drive field $H_L$ for selectively providing, in the air gap 196, the straight easy axis drive field $H_L$. Tape 170 passes between shaped drive line 174 and head 176 in the direction designated by arrow 198.

If, concurrent with the application of the shaped hard axis drive field $H_T$ to tape 170 by means of source 184 and tapered drive line 174, a continuously varying amplitude analog current signal is coupled to head 176 by means of source 190 and winding 194, there is coupled to tape 170 a corresponding easy axis drive field $H_L$ magnitude variation which produces a corresponding varying bias of the magnetization of tape 170. As previously discussed, as with FIG. 4, this bias is a function of the amplitude of the analog signal.

With particular reference to FIG. 17 there is presented an illustration of the signal waveforms associated with the embodiment of FIG. 14 for achieving both analog storage, by means of waveform 200, and digital storage, by means of waveform 202, in tape 170. The hard axis drive field $H_T$ of waveform 204 consists of a constant amplitude shaped field having a nominal intensity in the area of tape $\geqslant H_K$ of layer 168. The recording of the information represented by the easy axis drive field $H_L$ is achieved on the trailing off of the hard axis drive field $H_T$ in the vicinity of the air gap 196 through the $H_K$ value of the tape layer 168 as the tape passes by. Accordingly, the digital pulses of waveform 202 are illustrated as occurring at a time centered about the trailing off of the $H_T$ value through $H_K$ in the vicinity of the air gap 196 as the tape layer 168 passes by.

If at a time $t_0$, source 184, by means of switch 186, couples the current signal of waveform 204 to tapered drive line 174 there is generated in the area of tape 170 a directionally curved, or shaped, hard axis drive $H_T$ schematically represented by vectors 188 having the time, amplitude characteristic of waveform 204. With source 190 coupling a current signal having the time varying amplitude characteristic of waveform 200 to head 176 there is generated in air gap 196 an easy axis drive field $H_L$ having a time varying intensity in the area of tape 170. The resultant effect upon tape 170 is to cause its magnetizable layer 168 to become oriented, across the width of tape 170, into two domains of opposite polarities schematically illustrated by vectors 206, 208 separated by a domain wall 210. The shape of domain wall 210 along the moving tape 170 substantially conforms to that of waveform 200; it moving across the central longitudinal axis of tape 170 in a manner similar to which the amplitude, and polarity, of waveform 200 moves about its 0 axis 212.

In contrast to the analog storage of waveform 200 on tape 170 as illustrated in FIG. 14, digital storage of a current signal having the waveform 202 may be recorded on tape 170. With particular reference to FIG. 18 there is illustrated a schematic representation of the domain wall positioning in the magnetizable layer 168 of tape 170 for the storage of digital waveform 202. Digital storage is similar to that as discussed above with reference to analog storage, the only difference being the nature of the easy axis drive field $H_L$. With the corresponding sampling times $t_0$ through $t_{11}$ noted in FIGS. 17, 18 there are generated a series of domain walls 220 separating the two domains of opposite polarities across the width of tape 170 schematically illustrated by vectors 222, 224.

It is apparent that applicants have, in the above discussed embodiments, presented a novel method of and apparatus for generating shaped magneic drive fields for operating a thin-ferromagnetic-film layer having uniaxial anisotropy. It is understood that suitable modifications may be made in the structure and method as disclosed provided such modifications come within the spirit and scope of the appended claims. Having now, therefore, fully illustrated and described our invention, what we claim to be new and desire to protect by Letters Patent is set forth in the appended claims.

What is claimed is:

1. A method of generating a shaped drive field for operating a thin-ferromagneic-film layer having single domain properties and uniaxial anisotropy that provides small angular distribution of the layer's domains' easy axes about the layer's mean easy axis, comprising:

arranging a planar, nonparallel opposite sided drive line in an inductive relationship with said layer;

coupling a first current signal to said nonparallel sided drive line;

generating a corresponding directionally curved drive field in the area of said layer from said nonparallel sides;

directing said curved drive field to be nominally transverse said layer's mean easy axis;

directionally curvingly biasing the layer's magnetization in a directionally curved distribution of magnetization directions across the surface of said layer in a varying pattern.

2. The method of claim 1 further including:

arranging a planar straight drive line in an inductive relationship with said layer;

arranging said straight drive line, said nonparallel sided drive line and said layer in a stacked, superposed configuration with said layer sandwiched therebetween;

coupling a second current signal to said straight drive line;

generating a straight drive field in the area of said layer;

directing said straight drive field to be substantially parallel said layer's mean easy axis;

decoupling said curved drive field from said layer at a sample time;

biasingly collapsing said layer's magnetization about its mean easy axis at said sample time;

inducing a biased partial switching of said layer's magnetization that corresponds to said straight drive field intensity in the area of said layer at said sample time.

3. A method of generating a shaped hard axis drive field for operating a thin-ferromagnetic-film layer having single domain properties and uniaxial anisotropy that provides small angular distribution of the layer's domains' easy axes about the layer's mean easy axis, comprising:

arranging a nonlinear shaped drive line in an inductive relationship with said layer;

shaping said nonlinear shaped drive line to be symmetrical about its longitudinal axis; and, tapering the edges of said nonlinear shaped drive line from a relatively narrow to a relatively wide dimension across said layer;

coupling a first current signal to said nonlinear shaped drive line;

generating a corresponding nonlinear shaped hard axis drive field in the area of said layer;

directing said nonlinear shaped drive field nominally transverse said layer's mean easy axis; and, directionally curvingly biasing the layer's magnetization across said layer in a uniformly varying nonlinear shaped pattern that corresponds to the shape of the nonlinear shaped drive field.

4. The method of claim 3 further including:

tapering the edges of said nonlinear shaped drive line along a straight line.

5. The method of claim 3 further including:

tapering the edges of said nonlinear shaped drive line along a curved line.

6. The method of claim 3 further including:

forming an air gap in said nonlinear shaped drive line;

arranging said layer in said air gap;

orienting said nonlinear shaped hard axis drive field as a curvilinear drive field across said air gap.

7. The method of claim 6 further including:

arranging a straight drive line in an inductive relationship with said layer;

arranging said straight drive line and said layer in a stacked, superposed configuration;

coupling a second current signal to said straight drive line;

generating a straight drive field in the area of said layer;

directing said straight drive field to be substantially parallel to said layer's mean easy axis.

8. The method of claim 7 further including:

decoupling said curvilinear drive field from said layer at a sample time;

biasingly collapsing said layer's magnetization about its mean easy axis at said sample time;

inducing a biased partial switching of said layer's magnetization that corresponds to said straight drive field intensity in the area of said layer at said sample time.

9. A method of generating a shaped easy axis drive field for operating a thin-ferromagnetic-film layer having single domain properties and uniaxial anisotropy that provides small angular distribution of the layer's domains' easy axes about the layer's mean easy axis, comprising:

arranging a tapered drive line in an inductive relationship with said layer;

arranging said tapered drive line and said layer in a stacked, superposed relationship;

shaping the taper of said tapered drive line to increase in depth across said layer;

coupling a first current signal to said tapered drive line;

generating a shaped drive field by said first current signal;

shaping said shaped drive field by the taper of said tapered drive line to be directionally varying in intensity across the plane of the layer;

orienting said shaped drive field to be substantially parallel to said layer's mean easy axis providing a shaped easy axis drive field;

orienting said layer's magnetization directions across its planar dimensions in a varying pattern.

10. The method of claim 9 further including:

arranging a second straight drive line in an inductive relationship with said layer;

arranging said second straight drive line in a stacked, superposed relationship between said tapered drive line and said layer and oriented substantially parallel to said tapered drive line;

coupling a third current signal to said second straight drive line;

generating a second straight drive field by said third current signal;

orienting said second straight drive field to be substantially parallel to said layer's mean easy axis providing a straight easy axis drive field;

combining said straight easy axis drive field and said shaped easy axis drive field in the area of said layer to generate a net effective shaped easy axis drive field;

orienting said layer's magnetization directions across its planar dimensions in a varying pattern corresponding to the effect of said net effective shaped easy axis drive field.

11. The method of claim 9 further including:

arranging a first straight drive line in inductive relationship with said layer;

coupling a second current signal to said first straight drive line;

generating a first straight drive field by said second current signal;

orienting said first straight drive field to be substantially transverse said layer's mean easy axis providing a hard axis drive field;

biasing said layer's magnetization from said varying pattern caused by said easy axis drive field;

decoupling said hard axis drive field from said layer;

biasingly switching said layer's magnetization into a partially switched flux level, which level is representative of the effect of said shaped easy axis drive field at the instant of the decoupling of said hard axis drive field from said layer.

12. A method of generating a shaped hard axis drive field for operating a thin-ferromagnetic-film layer having single domain properties and uniaxial anisotropy providing small angular distribution of the layer's domains' easy axes about the layer's mean easy axis, comprising:

arranging a shaped hard axis drive line in an inductive relationship with said thin-ferromagnetic-film layer;

arranging a straight easy axis drive line in an inductive relationship with said layer;

coupling a constant amplitude current signal to said easy axis drive line;

generating an easy axis drive field;

biasing said layer's magnetization along its mean easy axis in response to said easy axis drive field;

coupling a continuously varying amplitude analog current signal to said shaped hard axis drive line;

generating, in the area of said layer, a shaped hard axis drive field corresponding to said shaped hard axis drive line;

directionally curvingly biasing said layer's magnetization from its mean easy axis biased manner into a uniformly varying shaped pattern across said layer corresponding to said analog current signal amplitude;

decoupling said easy axis drive field from said layer at a sample time;

biasingly collapsing said layer's magnetization about its easy axis at said sample time;

inducing a biased partial switching of said layer's magnetization that corresponds to the analog signal amplitude at said sample time.

13. A method of generating a shaped easy axis drive field for operating a thin-ferromagnetic-film layer having single domain properties and uniaxial anisotropy that provides small angular distribution of the layer's domains' easy axes about the layer's mean easy axis, comprising:

arranging a first tapered drive line in inductive relationship with said layer;

arranging a first straight drive line in inductive relationship with said layer;

arranging said first tapered drive line, said first straight drive line and said layer in a stacked superposed relationship;

coupling first and second current signals to said first tapered drive line and to said first straight drive line, respectively;

generating a first shaped drive field by said first and second current signals;

shaping said first shaped drive field by the taper of said first tapered drive line to be directionally curved in the plane of the layer;

orienting said first shaped drive field to be nominally parallel to said layer's means easy axis providing a shaped easy axis drive field;

orienting the layer's magnetization directions across its planar dimensions in a uniformly varying pattern corresponding to the net effect of said shaped easy axis drive field;

arranging a second straight drive line in inductive relationship with said layer;

coupling a third current signal to said second straight drive line;

generating a second straight drive field by said third current signal;

orienting said second straight drive field to be substantially transverse said layer's mean easy axis providing a hard axis drive field;

biasing the layer's magnetization from said uniformly varying pattern by said hard axis drive field;

decoupling said hard axis drive field from said layer;

biasingly switching the layer's magnetization into a partially transverse said layer's mean easy axis provid- of the said net effect of said shaped easy axis drive field upon the magnetization of said layer at the instant of the decoupling from said layer of said hard axis drive field.

14. The method of claim 13 in which said second current signal is a continuously varying analog signal.

15. The method of claim 13 in which the hard axis drive field has, in the area of the layer, an intensity equal to or greater than the $H_K$ of the layer.

16. A method of generating shaped easy axis drive field for operating a thin-ferromagnetic-film layer having single domain properties an uniaxial anisotropy that provides small angular distribution of the layer's domains' easy axes about the layer's mean easy axis, comprising:

arranging a second tapered drive line in inductive relationship with said layer;

arranging said first and second tapered drive lines and said layer in a stacked superposed relationship with said layer sandwiched therebetween;

coupling first and second current signals to said first and second tapered drive lines, respectively;

generating first and second shaped drive fields by said first and second current signals;

shaping said first and second shaped drive fields by the taper of said first and second tapered drive lines, respectively, to be directionally curved in the plane of the layer;

orienting said first and second shaped drive fields to be nominally parallel to said layer's mean easy axis providing first and second shaped easy axis drive fields, respectively;

orienting the layer's magnetization directions across its planar dimensions in a uniformly varying pattern corresponding to the net effect of said first and second shaped easy axis drive fields;

arranging a first straight drive line in inductive relationship with said layer;

coupling a third current signal to said first straight drive line;

generating a first straight drive field by said third current signal;

orienting said first straight drive field to be substantially transverse said layer's mean easy axis providing a hard axis drive field;

biasing the layer's magnetization from said uniformly varying pattern by said hard axis drive field;

decoupling said hard axis drive field from said layer; biasingly switching the layer's magnetization into a partially switched flux level which level is representative of the said net effect of said first and second shaped easy axis drive fields upon the magnetization of said layer at the instant of the decoupling from said layer of said hard axis drive field.

17. The method of claim 16 in which said second current signal is a continuously varying analog signal.

18. The method of claim 16 in which the hard axis drive field has, in the area of the layer, an intensity equal to or greater than the $H_K$ of the layer.

References Cited

UNITED STATES PATENTS 3,438,010 4/1969 Fuller ............... 340—174

JAMES W. MOFFITT, Primary Examiner

UNITED STATES PATENT OFFICE
CERTIFICATE OF CORRECTION

Patent No. 3,566,379 Dated February 23, 1971

Inventor(s) Maynard C. Paul et al.

It is certified that error appears in the above-identified patent and that said Letters Patent are hereby corrected as shown below:

Column 16, line 28, "transverse said layer's mean easy axis provid-" should read -- switched flux level, which level is representative --.

Signed and sealed this 29th day of June 1971.

(SEAL)
Attest:

EDWARD M.FLETCHER,JR.
Attesting Officer

WILLIAM E. SCHUYLER, JI
Commissioner of Patents

FORM PO-1050 (10-69)